US009049670B2

(12) United States Patent
Balachandran et al.

(10) Patent No.: US 9,049,670 B2
(45) Date of Patent: Jun. 2, 2015

(54) INTERFERENCE-IMPROVED UPLINK DATA RATES FOR A GROUP OF MOBILE STATIONS TRANSMITTING TO A BASE STATION (75) Inventors: Kumar Balachandran, Cary, NC (US); Leonid Krasny, Cary, NC (US)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 1964 days.

(21) Appl. No.: 11/969,002

(22) Filed: Jan. 3, 2008

(65) Prior Publication Data

US 2008/0300004 A1 Dec. 4, 2008

Related U.S. Application Data (60) Provisional application No. 60/924,846, filed on Jun. 1, 2007.

(51) Int. Cl.
*H04B 7/00* (2006.01)
*H04W 52/26* (2009.01)
*H04W 52/14* (2009.01)
*H04W 52/34* (2009.01)
*H04B 7/06* (2006.01)
*H04W 52/24* (2009.01)

(52) U.S. Cl.
CPC ........... *H04W 52/267* (2013.01); *H04B 7/0617* (2013.01); *H04W 52/146* (2013.01); *H04W 52/241* (2013.01); *H04W 52/34* (2013.01)

(58) Field of Classification Search
CPC ... H04W 52/40; H04W 48/20; H04W 52/283; H04W 52/34; H04W 52/346; H04W 24/00; H04W 36/08; H04W 36/20; H04W 52/24; H04W 52/32; H04W 52/322; H04W 52/325; H04B 7/022; H04B 17/0057; H04B 17/0077
USPC .................. 455/522, 562.1, 562.2, 453, 561; 370/468
See application file for complete search history.

(56) References Cited

U.S. PATENT DOCUMENTS

2005/0107090 A1* 5/2005 Hosein .......................... 455/453
2005/0250544 A1 11/2005 Grant et al.
(Continued)

OTHER PUBLICATIONS

T. Haustein; C. Zhou; A. Forck, H. Gabler; C. V. Helmolt; V. Jungnickel and U. Kruger, "Implementation of Channel Aware Scheduling and Bit-loading for Multiuser SIMO MAC in a real-time MIMO Demonstration Test-bed at high Data Rate", Vehiculer Technology Conference, 2004. VTC2004-Fall. 2004 IEEE 60th, vol. 2,No., pp. 1043-1047 vol. 2 Sep. 26-29, 2004.*
(Continued)

*Primary Examiner* — Golam Sorowar (57) ABSTRACT

A base station maximizes an uplink data transmission rate from multiple mobiles treated by the base station as a virtual single uplink transmitter. The base station identifies a set of mobile stations as a candidate transmitting set and determines a transmit power allowable from the mobile stations in the candidate transmitting set. A subset of those mobile stations in the candidate transmitting set is identified. Uplink data transmission rates are assigned and communicated to the subset of mobile stations in the candidate transmitting set so as to optimize a total number of bits processed by the base station associated with the uplink transmissions received from the subset of candidate mobile stations. The optimization may accomplish one or more objectives in addition to optimizing the total number of bits processed.

25 Claims, 5 Drawing Sheets

(56) References Cited

U.S. PATENT DOCUMENTS

2005/0277444 A1* 12/2005 Rensburg et al. .......... 455/562.1
2007/0127586 A1 6/2007 Hafeez

OTHER PUBLICATIONS

Guangyi Liu; Jianhu Zhang, "Comparative Investigation on MU-MIMO Schemes for TDD MIMO OFDMA Uplink" wireless communication, networking and Mobile Computing, 2006. WiCOM 2006. International Conference on, vol., No., pp. 1-4, Sep. 22-24, 2006.*

Won-Hyoung Park; Sunghyun Cho and Saewoong Bahnk, "Scheduler Design for Mulitple Traffic Classes in OFDMA network" Communication, 2006. ICC 06. IEEE international conference on, vol. 2, No. pp. 790-795, Jun. 2006.*

International Preliminary Report on Patentability mailed Dec. 12, 2009 in corresponding PCT Application PCT/SE2008/050078.

International Search Report and Written Opinion mailed Nov. 12, 2008 in corresponding PCT Application PCT/SE2008/050078.

Haustein et al., Implementation of Channel Aware Scheduling and Bit-loading for the Multiuser SIMO MAC in a Real-time MIMO Demonstration Test-bed at High Data Rate, Vehicular Technology Conference 2004, 2004 IEEE $60^{th}$, vol. 2, pp. 1043-1047, Sep. 26-29, 2004.

Guangyi et al., Comparative Investigation on MU-MIMO Schemes for TDD MIMO OFDMA Uplink, Wireless Communications, Netowrking and Mobile Computing 2006, WiCOM 2006, pp. 1-4, Sep. 22-24, 2006.

Won-Hyoung et al., Scheduler Design for Multiple Traffic Classes in OFDMA Netowrks, Communications, 2006, ICC '06, IEEE International Conference, vol. 2, pp. 790-795, Jun. 2006.

Ericsson, Selective Per Antenna Rate Control (S-PARC), 3GPP TSG RAN WG1 #36, Malaga, Spain; Feb. 16-20, 2004, R1-040307, p. 3.

S.T. Chung et al., "Approaching the MIMO Capacity with a Low-Rate Feedback Channel in V-BLAST: Theory and Practice", EURASIP Journal on Applied Signal Processing 2004:5, 762-771.

S. Grant et al., "Per-Antenna-Rate-Control (PARC) in Frequency Selective Fading with SIC-GRAKE Receiver", in Proc. IEEE VTC '04-Fall, Los Angeles, CA, Sep. 2004.

Leonid Krasny et al., "Transmit Diversity with Constrained Feedback", $14^{th}$ $1^{st}$ Mobile and Wireless Communications Summit, 2005.

* cited by examiner

INTERFERENCE-IMPROVED UPLINK DATA RATES FOR A GROUP OF MOBILE STATIONS TRANSMITTING TO A BASE STATION

This application claims priority from U.S. provisional patent application Ser. No. 60/924,846, filed on Jun. 1, 2007, the contents of which are incorporated here by reference.

TECHNICAL FIELD

The technology described here relates to radio communications, and more particularly, to using multiple antennas to increase capacity and services provided to radio terminals.

BACKGROUND

The introduction of new services in wireless networks puts a premium on spectral efficiency and coverage in cellular radio networks. Cellular networks have come a long way since the analog voice telephone systems of the mid 1980s, such as the Advanced Mobile Phone Service (AMPS) or the Nordic Mobile Telephone (NMT) System. The 1990s saw the introduction of second generation digital cellular technologies such as the Global System for Mobile Communication (GSM) and packet data systems such as the General Packet Radio Service (GPRS) and their evolved third generation versions, Enhanced Data Rates for Global Evolution (EDGE) and Enhanced GPRS (EGPRS), respectively. The need for higher bandwidths and data rates also led to standardization of the Universal Mobile Telephone Service (UMTS). Third Generation (3G) standardization of GSM/EDGE and UMTS has been carried out in the 3GPP, whose focus has been on specifying a High Speed Packet Access (HSPA) service for WCDMA and Orthogonal Frequency Division Multiplexing (OFDM)-based evolution of 3G in a standard known as Long Term Evolution (LTE).

The performance of a wireless network is evaluated using several figures of merit, such as data rates, coverage and capacity. Capacity is interpreted in two different ways depending on the context of use. The classical definition of capacity is obtained from Shannon's a theoretical maximum rate of transmission at which communication can proceed over a noisy channel with arbitrarily low error probabilities. If the channel has no feedback from the receiver back to the transmitter, the figure of merit obtained is the open-loop capacity, while a channel with feedback may be used to derive a closed loop capacity. In the context of this application, the term capacity refers to the Shannon capacity of the communication channel. Cellular systems may also define capacity in terms of measures such as erlang capacity per cell referring to the number of call-hours of conversation for telephony, or measures of spectral efficiency identifying the number of bits of information transferred to the receiver per second of time per Hz of consumed bandwidth per cell (b/s/Hz/cell).

Using multiple antenna technologies improves data rates, coverage, and capacity. Multiple antenna technologies may employ Space-time Transmit Diversity (STTD), beam-forming, Spatial Multiplexing (SM), or Multiple-Input Multiple Output (MIMO). Another multiple antenna technology called Per-Antenna Rate Control (PARC) has been proposed for use in base station transmitters.

The PARC scheme is based on a combination transmit/receive architecture that performs independent coding of multiple downlink antenna streams transmitted at different rates, which is then complemented by the application of successive interference cancellation (SIC) at the receiver. PARC requires feedback from the receiving mobile terminal or station of the per-antenna data rates that are related to the signal-to-interference-plus-noise ratio (SINR) at each stage of the SIC. It has been shown that the PARC scheme can achieve an open-loop Shannon capacity of the MIMO channel in a flat-fading environment. Closed loop Shannon capacity is greater than open loop Shannon capacity due to the availability of channel state information from the receiver. In frequency selective MIMO channels, the performance of the PARC scheme suffers with respect to the capacity-achieved using a closed-loop transmission scheme.

Selective-Per-Antenna-Rate-Control (S-PARC) is an extension of PARC. The S-PARC scheme can achieve rates that are between the open loop and closed loop capacity. While the PARC scheme simultaneously transmits separately encoded streams at different rates from all available transmit antennas, the S-PARC scheme improves performance by adaptively selecting a subset of the available transmit antennas from which to transmit a reduced number of data streams. This maximizes the data rate transmitted while simultaneously limiting the self-interference between streams. The selection of the best antennas for transmission is determined by maximizing the sum rate of the transmitted data streams over the possible antenna combinations of the subset of antennas. Essentially, when radio channel conditions are poor, fewer data streams are transmitted. As conditions improve, more data streams are transmitted. By limiting the number of transmitted data streams to what the channel supports, excessive self-interference is avoided. Furthermore, when the number of transmitted streams is limited, antenna selection exploits available transmit diversity.

The PARC and S-PARC approaches can be used for multiple antenna transmissions on the downlink, and work rather well in enhancing rate, coverage, and capacity when transmitting data downlink from a base station to multiple mobiles in the system. But the inventors recognized that there is a need for similar enhancements for uplink communications from mobiles to the radio network. Indeed, certain classes of applications, such as video telephony, video blogging, file transfer for peer-to-peer applications, etc., are some examples of uplink applications that would immediately benefit from enhanced transmission rate, coverage, or capacity. Although MIMO solutions proposed for the downlink are capable of enhancing the amount of data traffic being sent from the base station, they have limited applicability to uplink communications because mobile stations typically do not use more than one transmit antenna. The single antenna limitation is a direct result of the small size of the mobile station and limited transmitted power typically available. Even if it were possible to build a mobile station with multiple antennas, the channels from those antennas to one particular receive antenna on the base station may be correlated limiting the diversity gain on the uplink.

SUMMARY

These and other problems are overcome by the technology described below that implements an effective S-PARC for the uplink. In this context, a base station maximizes an uplink data transmission rate from multiple mobiles treated by the base station as a virtual single uplink transmitter. The base station identifies a set of mobile stations as a candidate transmitting set and determines a transmit power allowable from the mobile stations in the candidate transmitting set. A subset of those mobile stations in the candidate transmitting set is identified. Transmission resources, e.g., a combination of power, time, and/or frequency, are assigned and communicated to the subset of mobile stations in the candidate transmitting set so as to optimize a total number of bits processed by the base station associated with the uplink transmissions received from the subset of candidate mobile stations. The optimization may accomplish one or more objectives in addition to optimizing the total number of bits processed. For example, the uplink data transmission rates may be assigned to the subset of mobile stations in the candidate transmitting set in order to maximize a combined uplink transmission rate from that subset of mobile stations.

In one non-limiting example embodiment, a fraction of a total uplink transmission capacity available in a cell area is determined for a desired mobile station service. Multiple mobile stations in the candidate transmitting set that are requesting the desired service are ranked according to a priority scheme. The subset of the mobile stations from those ranked in the candidate transmitting set are selected to be those that have the best priority. A combination of the subset of the mobile stations is then determined that permits the base station to achieve a highest combined uplink transmission rate (in this example).

The prioritization may be performed based on a received signal quality measure or based on one or more other or additional factors. For example, the mobile stations in the candidate transmitting set could be ranked in accordance with a priority measure that is proportionally fair in allocating uplink transmission rates for the subset of the mobile stations in the candidate transmitting set. The fairness measure might be based on a ratio of an uplink transmission rate requested and an average uplink transmission rate supported. Alternatively, the fairness measure could be based on a Modified Largest Weighted Delay Fairness (MLWDF) measure. Another alternative is to rank the mobile stations in the candidate transmitting set in order to achieve a greatest revenue associated with providing the desired mobile station service. In addition, the number of mobiles stations in the subset of the mobile stations might also be set to a value that maximizes data rate or revenue for one or more classes of service.

This technology is well suited for (but not limited to) an implementation where uplink transmissions use orthogonal frequency division multiple access.

DETAILED DESCRIPTION

In the following description, for purposes of explanation and non-limitation, specific details are set forth, such as particular nodes, functional entities, techniques, protocols, standards, etc. in order to provide an understanding of the described technology. In other instances, detailed descriptions of well-known methods, devices, techniques, etc. are omitted so as not to obscure the description with unnecessary detail. Individual function blocks are shown in the figures.

Those skilled in the art will appreciate that the functions of those blocks may be implemented using individual hardware circuits, using software programs and data in conjunction with a suitably programmed microprocessor or general purpose computer, using applications specific integrated circuitry (ASIC), programmable logic arrays, and/or using one or more digital signal processors (DSPs). It will be apparent to one skilled in the art that other embodiments may be practiced apart from the specific details disclosed below.

Figure 1:
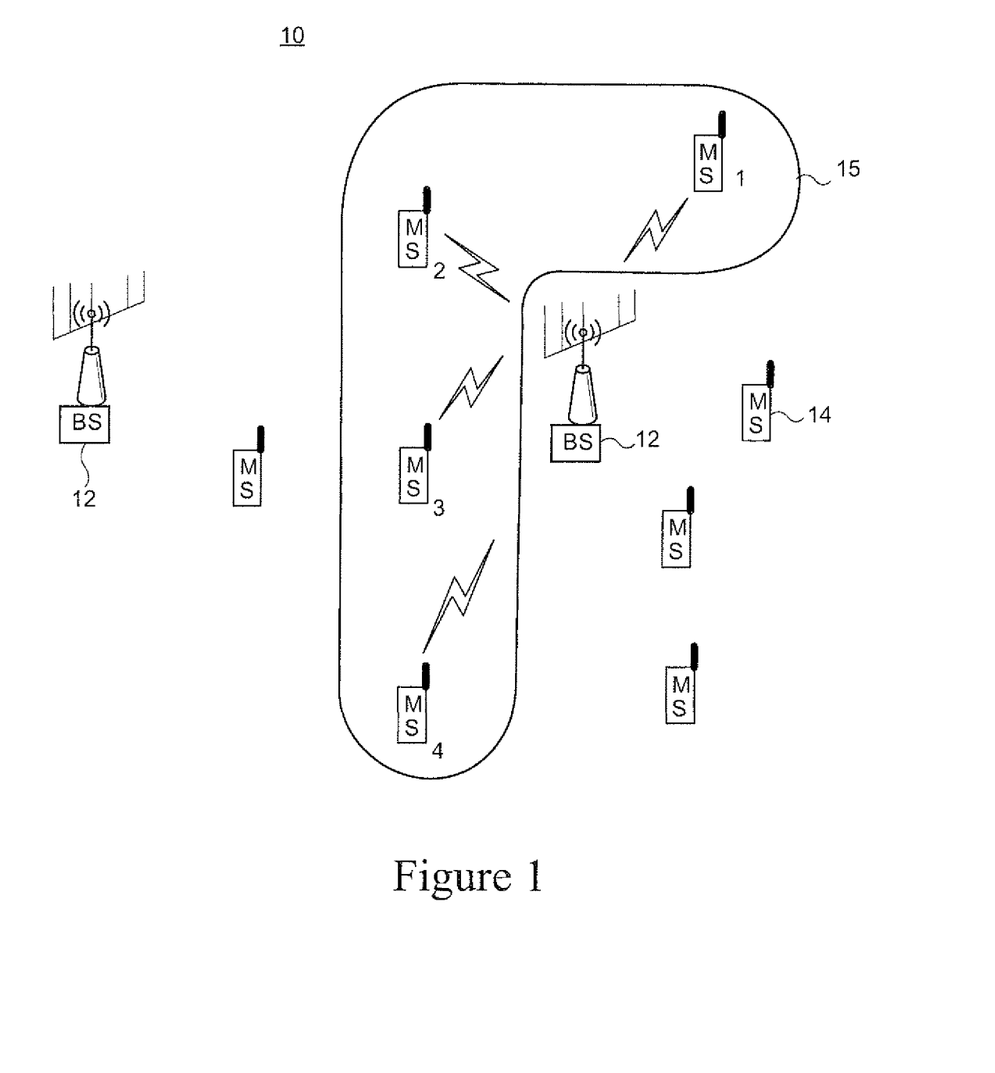
FIG. 1 illustrates an example simplified mobile radio communication system.

FIG. 1 illustrates an example simplified mobile radio communication system 10 including one or more base stations 12 that provide service in one or more cell areas. The base station 12 includes multiple antennas and communicates with multiple mobile stations or user equipments (UEs) 14. The term mobile station is used here as a comprehensive term for a mobile or stationary radio terminal device and includes UEs. The base station forms a group or subset 15 of mobile stations that are preferably sufficiently spaced from each other to reduce correlation of the uplink channels from those mobile stations to receive antennas at the base station. In this non-limiting example, mobile stations MS1-MS4 are included in the group 15.

By treating multiple mobile stations as a group, a virtual uplink transmitter is created that can effectively use multiple antenna transmission from the group of multiple mobiles to achieve greater data rates and capacity in the uplink. In this way, a group of multiple mobile terminals 14 desiring high data rate services can attain a high data rate to the radio network (and then ultimately to the Internet) by limiting the interference to the system caused by several transmitting mobiles. The base station 12 assigns the group 15 of mobile terminals 14 access to uplink radio channel resources during a transmission opportunity (e.g., a frame or slot of fixed duration) so as to maximize the uplink transmission rate aggregated for all of the mobiles in the group by the base station 14 for data to be provided on to a core network and the Internet. The group of individual mobile terminals can also be viewed conceptually as a single uplink transmitter with multiple transmit antennas spread around the cell. With the mobiles being spread around the cell, there is relatively low correlation between the channel paths from each mobile's corresponding antenna to the receive antennas at the base station. A channel data rate is assigned to the group of mobile stations out of those desiring service from the network, and each mobile in the group then transmits at a given transmission opportunity, e.g., during a fixed time frame. The number of selected mobile stations in the group may be set to a value that maximizes data rate or revenue for one or more classes of service.

Figure 2:
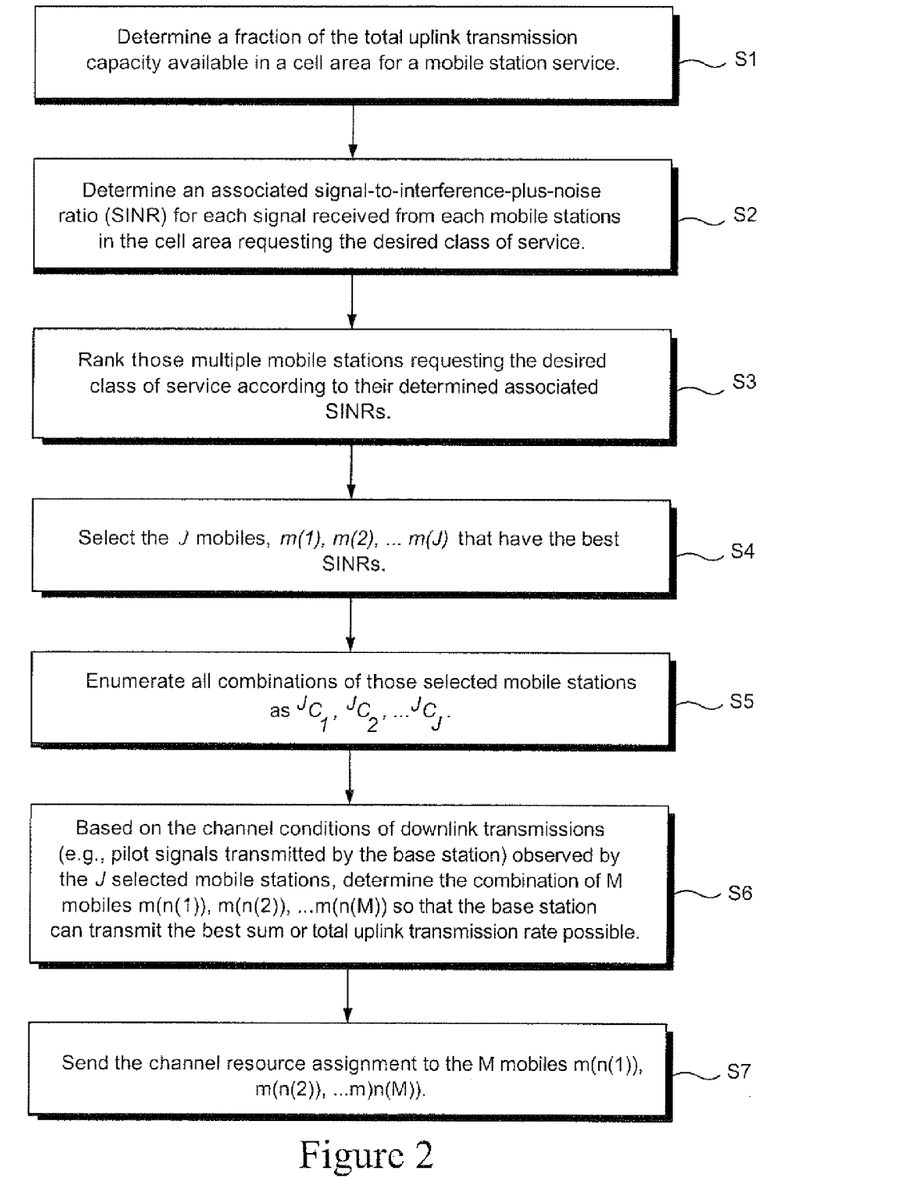
FIG. 2 is a flowchart illustrating non-limiting, example procedures for providing enhanced uplink data rates or capacity for a group or subset of mobile stations transmitting to a base station with multiple receive antennas.

FIG. 2 is a flowchart illustrating non-limiting example procedures implemented in one or more radio network nodes (in this non-limiting example, the network node is a base station 12) for providing enhanced uplink data rates or capacity for a group of mobile stations transmitting as a virtual single unit to a base station with multiple receive antennas. A fraction of the total uplink transmission capacity available in a cell area for a mobile station service is determined (step S1). The base station determines an associated signal-to-interference-plus-noise ratio (SINR) or other signal quality measure for each signal received from each mobile station in the cell area requesting a desired class of service (step S2). Those multiple mobile stations requesting the desired class of service are ranked according to their determined associated SINRs as $m(0), m(1), \ldots m(N)$ (step S3). The base station selects the J mobiles, $m(1), m(2), \ldots m(J)$ that have the best SINRs (step S4). All combinations of those selected mobile stations are enumerated as ${}^J C_1, {}^J C_2, \ldots, {}^J C_J$ (step S5), where the notation $^nC_k$ has the usual meaning given in factorial notation as n!/(k!(n−k)!). Then, based on the channel conditions of downlink transmissions (e.g., pilot signals transmitted by the base station to mobile stations) observed by the J mobile stations and reported back to the base station, the base station determines a combination of M mobiles m(n(1)), m(n(2)), . . . m(n(M)) that permits the base station to serve the highest "sum rate" possible (step S6). M is a number satisfying 1<=M<=J. Sum rate means the total uplink transmission data rate achieved by adding together the individual uplink transmission rates from each of the mobile stations.

The base station then sends a channel resource assignment to the mobiles m(n(1)), m(n(2)), . . . m(n(M)) (step S7) and repeats steps S1-S7 for the next transmission opportunity. The channel resource assignment may be, for example, a message that specifies the time and/or frequencies at which mobile station will transmit on the uplink from which the rate of transmission and the number of bits (and thus, the modulation and channel coding scheme as well) that the mobile station will transmit in the allocated space can be determined. This assignment is independent of the multiple access technology used and may be used for example for OFDMA, CDMA or TDMA based technologies.

Ranking mobile stations before determination of the J best mobile stations may be based on something other than or in addition to SINR. For example, the ranking could be based on a fairness criterion such as a proportionally fair priority measure. Another example could be a fairness measure based on a ratio of an uplink transmission rate requested and an average uplink transmission rate supported. Another fairness example could be a Modified Largest Weighted Delay Fairness (MLWDF) measure. Alternatively or in addition, a weighting of the cost of service could be factored into the ranking process.

As a result of this technology, a multiple antenna transmission technique previously only effective for downlink transmissions can be applied to uplink transmission applications. Selective Per Antenna rate Control (S-PARC) using Successive Interference Cancellation (SIC) is the preferred multiple antenna transmission technique. OFDM-based transmission and reception are assumed as the physical layer access technique as preferred but still example embodiment, although OFDM/OFDMA is not required. The Selective-PARC formulation is by definition limited to situations where the maximum transmit power of each mobile station is constrained. Individual transmissions from mobile stations are usually power-limited to control the interference posed by those mobile stations to other cells.

The achievable data rate for a multiple mobile uplink transmission is determined by taking into account that the instantaneous signal-to-interference-plus-noise ratio (SINR): labelled in equation (1) as $\rho(f_k,m)$, at the output of the Successive Interference Canceller (SIC) in the base station receiver corresponding to the transmitted stream m and the OFDM sub-carrier k:

$$\rho(f_k; m) = \frac{E_s}{J} G_m^\dagger(f_k) K^{-1}(f_k; m) G_m(f_k), \quad (1)$$

where $E_s$ is a fixed total power of the data symbols transmitted by J mobiles, $f_k$ corresponds to the frequency of subcarrier k, $G_m(f_k)$ is the $m^{th}$ column vector of the ($N_r$ X J) matrix:

$$G(f) = \begin{bmatrix} G(f;1,1) & G(f;1,2) & \cdots & G(f;1,J) \\ G(f;2,1) & G(f;2,2) & \cdots & G(f;2,J) \\ \vdots & \vdots & \vdots & \\ G(f;N_r,1) & G(f;N_r,2) & \cdots & G(f;N_r,J) \end{bmatrix}, \quad (2)$$

which describes a frequency response of the MIMO channels between J mobiles and $N_r$ receive antennas at the base station, and $K(f_k; m)$ is the noise correlation matrix at the output of the SIC receiver corresponding to the $m^{th}$ stream. $G_m$ is the mth column vector, and $G_n$ is the nth column vector, where n and m are indices used for convenience. The correlation matrix $K(f_k; m)$ can be obtained through the following:

$$K(f_k; m) = N_0 + \frac{E_s}{J} \sum_{n \in A(m)} G_n(f_k) G_n^\dagger(f_k), \quad (3)$$

where $N_o$ is a spectral density of the inter-cell interference plus antenna thermal noise, and A(m) denotes the set of streams that have yet to be decoded and subtracted through SIC process. $E_s$ may be determined from knowledge of the mobile transmitted power, e.g., from transmit power control commands sent from the base station to the mobile.

The instantaneous uplink data rates $R(f_k,m)$ corresponding to the transmitted stream m from each mobile station can be obtained by mapping the instantaneous effective SINR, i.e, the $\rho(f_k,m)$ determined according to equation (1), using a Modulation and Coding Scheme (MCS) look-up table represented as:

$$R(f_k,m) = MCS\{\rho(f_k,m)\}, \quad (4)$$

to an allowable rate of transmission $R(f_k,m)$ for each subcarrier and across all the mobile stations in the subset or group.

The rate per channel use per mobile is then determined corresponding to the coding across different frequencies by summing the rates $R(f_k,r)$ over $N_f$ sub-carriers:

$$\overline{R}(m) = \frac{1}{N_f} \sum_{k=1}^{N_f} R(f_k, m). \quad (5)$$

The rates $\overline{R}(m)$ are summed over all transmitted streams from the mobile sation in the subset or group using the formula:

$$R_\Sigma(C_n^J) = \sum_{m \in S_{C_n}} \overline{R}(m), \quad (6)$$

where $S_{C_n}$ is the $n^{th}$ subset of J mobiles which can be chosen for transmission. The combination of the mobile stations that gives the maximum rate is then selected using:

$$R_{max} = \max_{C_n^J} \{R_\Sigma(C_n^J)\}. \quad (7)$$

Figure 3:
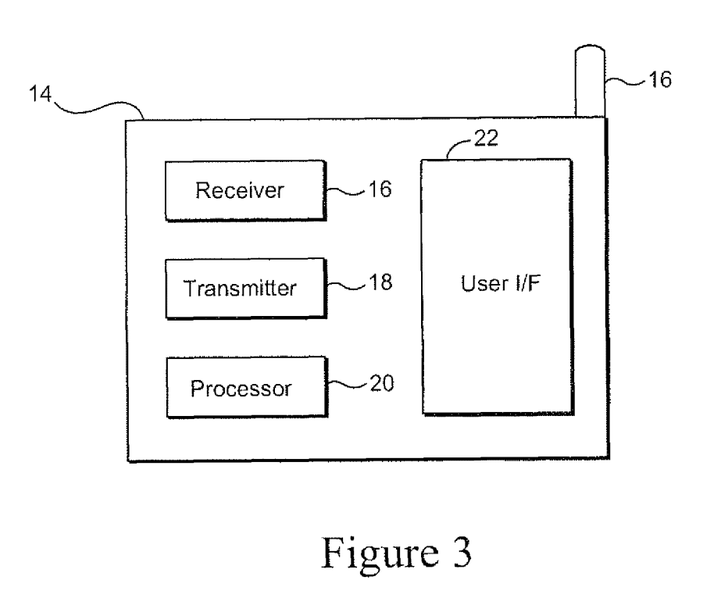
FIG. 3 is a non-limiting example function block diagram of a mobile station.

FIG. 3 illustrates a simplified function block diagram of a mobile station 14. The mobile station includes a receiver 16 and transmitter 18 coupled to an antenna 24. A user interface 22 that may include a keypad, display, speaker, microphone, etc. allows a user to communicate. A processor 20 controls the operation of the mobile 14. The mobile receives signals from the base station and transmits information to the base station at predetermined uplink rates and a predetermined time frame determined by the base station.

Figure 4:
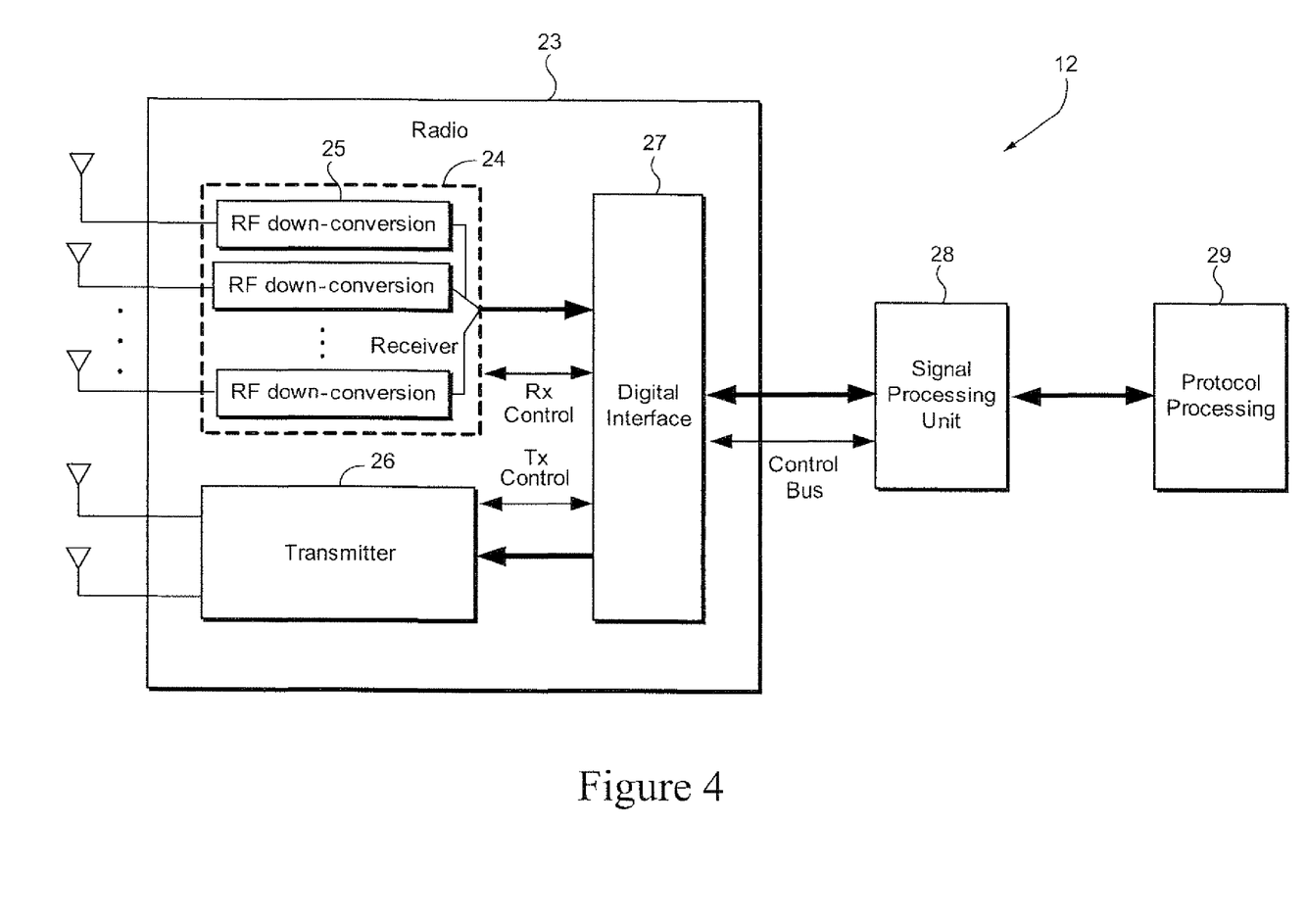
FIG. 4 is a non-limiting example function block diagram of a base station.

FIG. 4 is a non-limiting example function block diagram of a base station 12. The base station includes multiple antennas for receiving and transmitting. Antennas are coupled to both a receiver 24 and a transmitter 26. The receiver includes an RF to baseband downconverter 25 for each receive antenna. The received baseband signals are provided to a digital interface 27 which then provides them to a signal processing unit 28, which is where the processing outlined in FIG. 2 may take place for example. The processed signals are then proved to a protocol processor 29 to perform processing tasks associated with higher communications protocol layers before sending the received data to the end application(s). This diagram is for illustration only and is not meant to be limiting. For example, in a time division duplex (TDD) system, the transmit antennas and an equivalent number of receive antennas may be shared using a switch that selects the transmit or receive chain at the appropriate time. Likewise, a frequency division duplex (FDD) system may use a frequency duplexor. There are many ways of interfacing a radio to a baseband processor and to other control processors that may be needed in a base station, and the illustration is only one example way.

Figure 5:
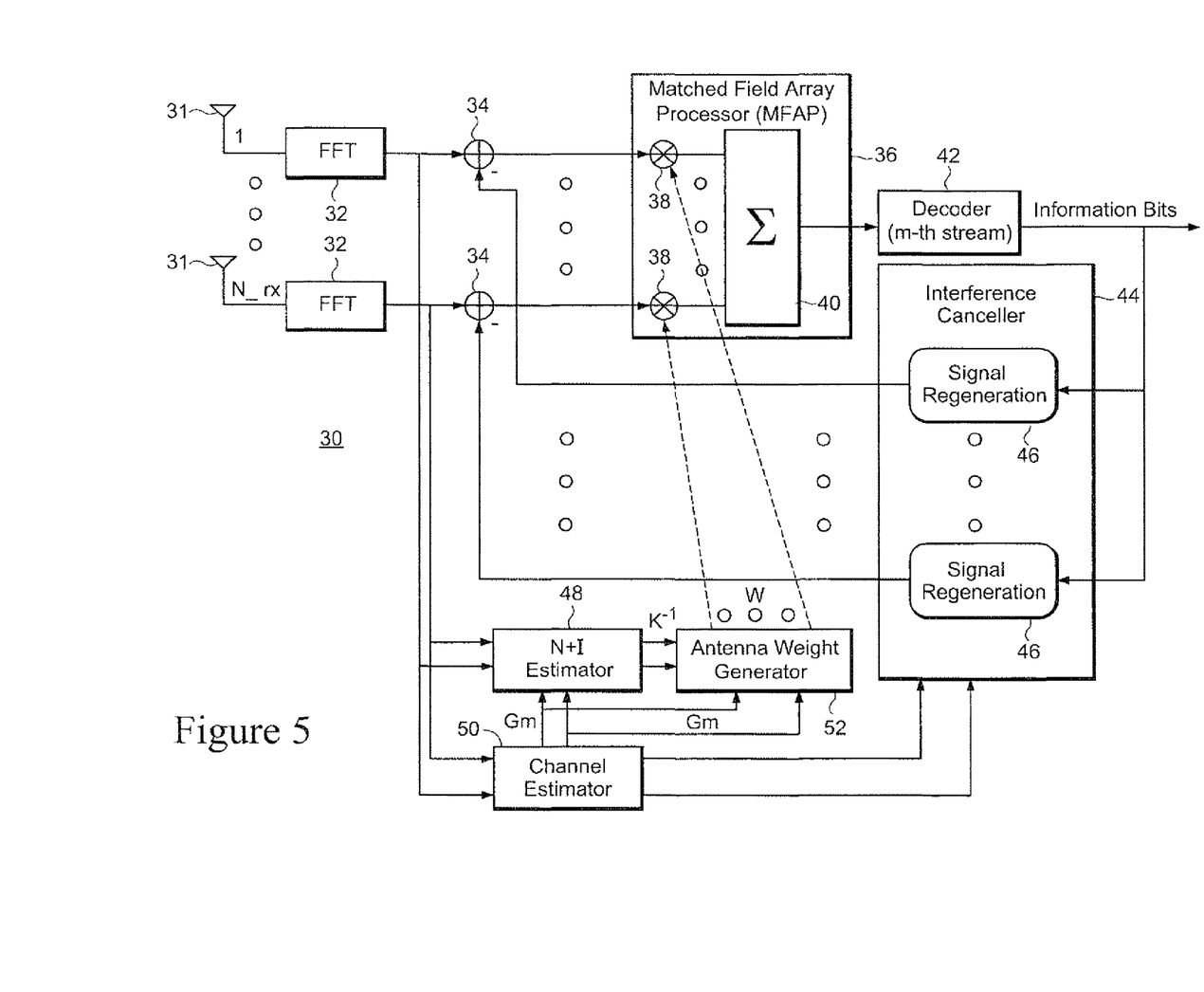
FIG. 5 is a function block diagram of a non-limiting example of an S-PARC base station receiver.

FIG. 5 is a non-limiting example function block diagram of a base station receiver 30 that may be used in the base station 12 to implement the non-limiting, uplink S-PARC example. It will be appreciated that other types of receivers may be used. In this non-limiting example, the base station receiver 30 is an OFDM MIMO-based receiver that is used to recover the data transmitted from the group of multiple mobile stations previously selected for an uplink transmission. The example receiver 30 employs both a matched-field array processor (MFAP) 36 and a successive interference canceller (SIC) 44. The receiver 30 includes multiple N receive (rx) antennas 31. Each OFDM antenna data symbol stream is converted to baseband (not shown) and then demodulated using a fast Fourier transform (FFT) 32. The FFT outputs are then decoded in the matched-field array processor (MFAP) 36 which begins by decoding the symbols $X_1(f_k)$ corresponding to a first stream of data transmitted by a first mobile station. In this case, the symbols $X_1(f_k)$ from the first mobile station experience spatial interference from all other symbols $X_2(f_k), \ldots, X_J(f_k)$ transmitted by all other mobile stations received by the base station receiver 30.

Once the symbols $X_1(f_k)$ are decoded, their interference is removed at the subtractors 34 from the received signal before the symbols $X_2(f_k)$ corresponding to the second mobile station's stream of data are demodulated. As a result, the symbols $X_2(f_k)$ only experience spatial interference from the symbols $X_3(f_k), \ldots, X_J(f_k)$. Similarly, before demodulating the symbols $X_m(f_k)$, the interference from the symbols $X_1(f_k), \ldots, X_{m-1}(f_k)$ is removed at the subtractors 34.

The matched-field array processor 36 implements the following:

$$U(f_k;m) = Y(f_k;m)W^\dagger(f_k;m), \quad (8)$$

where the signals $Y(f_k;m)$ are combined with antenna weights $W(f_k;m)$ to match with the signal and noise fields at receive antennas 31, and the antenna weights are indicated with a superscript to be conjugate transposed. The antenna weights $W(f_k;m)$ in equation (8) satisfy the following system of equations:

$$\hat{K}(f_k;m)W(f_k;m) = \hat{G}_m(f_k), \quad (9)$$

where $\hat{G}_m(f_k)$ is an estimate of the channel $G_m(f_k)$ and $\hat{K}(f_k;m)$ is an estimate of the noise correlation function $K(f_k;m)$ corresponding to the m-th stage of the successive interference cancellation (SIC) process. The signals $Y(f_k;m)$ in equation (8) are calculated according to the successive interference cancellation algorithm:

$$Y(f_k;m) = Y(f_k) - \sum_{n=1}^{m-1} \hat{G}_n(f_k)\hat{X}_n(f_k), \quad (10)$$

where $Y(f_k)$ is the $(1 \times N_{rx})$ vector of the received signals at $N_{rx}$ receive antennas, and $$\hat{X}_n(f_k) = \frac{U(f_k;n)}{\hat{G}_n(f_k)W^\dagger(f_k;n)} \quad (11)$$

is an estimate of the n-th transmitted data symbol. The estimate $\hat{X}_m(f_k)$ is used to generate soft bit values for the encoded bits transmitted by the m-th user. These soft bit values are then fed to the decoder 42 for the m-th stream. If the decoder 42 can decode the information bits for the m-th stream correctly, these information bits are used by the interference canceller 44 to regenerate the portion of the received signals (at each receive antenna) corresponding to the m-th transmitted data stream using the signal regenerators 46. The regenerated signals for data streams 1 through m expressed by:

$$\hat{S}(f_k;n) = \hat{G}_n(f_k)\hat{X}_n(f_k), \; n \in [1,m] \quad (12)$$

are then subtracted in the subtractors 34 from the demodulated signal from each receive antenna 31 (see equation (10)). These $N_{rx}$ subtracted signals $Y(f_k;m+1)$ are then used to detect the bits in the (m+1)-th transmitted data stream using the channel estimator 50, the N+I (Noise+Interference) estimator 48, and the antenna weight generator 52. The channel estimator 50 estimates the MIMO radio channels $G(f_k)$ between the transmitter and the receiver This is done using pilot signals known at the base station as is understood to people versed in the art. The N+I estimator 48 estimates the correlation matrix $K(f_k;m)$ of the noise+interference at each stage of the SIC process using equation (3). The antenna weight generator 52 calculates the antenna weights $W(f_k;m)$ using equation (9). The weights match the receiver with the received signal so as to maximize the signal-to-noise ratio of the filtered received signal.

To help aid in understanding this technology, a simple non-limiting example of uplink data rate maximization is described for a group of mobile stations. Consider a case with J=3 and three mobile stations m1, m2, and m3 selected by the base station as the best candidates (e.g., highest SINRs of the group) for the uplink transmission in the next time frame. The possible combinations of the three mobiles are as follows:

1—A single mobile transmits, where any one of the mobiles m1, m2, or m3 transmits. The uplink transmission rates R are assumed in this example, under some suitable transmit power constraint, to be R1=200 kb/s, R2=300 kb/s, and R3=1 Mb/s. R1, R2, and R3 are the respective uplink rates if only one stream is transmitted from mobile 1, mobile 2, or mobile 3, respectively.

2—If two mobiles transmit, then any one of the combinations {m1, m2}, {m2, m3}, or {m3, m1} is possible. In this case, the corresponding summed rates for these possibilities are R12=400 kb/s, R23=1.2 Mb/s and R31=900 kb/s respectively. It is noted that when both mobile 1 and mobile 2 transmit their own streams, the effective uplink transmission rate of R12=400 is less than R1+R2=500 kb/s because of the effect of interference between those streams. Similar relationships are evident between R23, R31 and the corresponding single-stream rates.

3—If three mobiles transmit, then the sum rate for this example is assumed to be R123=1.1 Mb/s.

In these three alternatives, the example quantities R1, R2, R3, R12, R23, R31, and R123 correspond to values calculated using equation (6). From these rate values, a sum uplink transmission rate is maximized by selecting mobiles m2 and m3 transmit streams. The channel can then support a data transmission rate of 1.2 Mb/s, which is the highest uplink transmission rates of the three combinations above, while still limiting the effect of the uplink transmission on the interference level in the system.

When using S-PARC, limiting the transmit power levels for mobile transmissions is necessary. One example way to set an uplink transmit power constraint that does not require transmit power control is now described, although other different ways may be used. Assume in this example, that the total power radiated in a cell must be limited to some nominal level, say P, and that each mobile station is restricted to a preset maximum power level, $P_{max}$. Given these parameters, one way to constrain the uplink transmit power is to divide the nominal cell power P among the M chosen mobiles with the additional constraint that no individual mobile can transmit at a power $P_i$ that exceeds a power level $P_{max}$. If $P_{max}$=200 mW, J=3, and P=400 mW, then M=3 results in mobile stations m1, m2, and m3 each with an assigned power level P/3=400/3=133.33 mW. Considering all combinations of two mobiles, {m1, m2}, {m2, m3}, and {m3, m1}, each mobile station in a pair is limited to a peak transmission power of P/2=200 mW. For the third combination option where each mobile m1, m2, and m3 transmits individually, each mobile is limited by the peak power level $P_{max}$ to 200 mW.

One example way to set an uplink transmit power constraint that uses transmit power control is now described, although other different ways may be used. Assume the same values for P, $P_{max}$, and M as in the first example above. For a first combination of mobiles m1, m2 and m3, each mobile is assigned a power level P1, P2 and P3 in such a way that P1+P2+P3<=400 mW. Each of the power levels P1, P2 and P3 are in turn set according to a transmit power control procedure that prescribes a predetermined ratio of P1:P2:P3 to allocate the 400 mW between the three transmitting mobiles and fixes that ratio for all cases of 3 mobiles transmitting.

For combinations of two mobiles, {m1, m2}, {m2, m3} and {m3, m1}, each combination could be assigned power levels such that P1+P2<=400 mW, P2+P3<=400 mW or P3+P1<=400 mW respectively. Again, the transmit power control procedures for two transmitting mobiles could also prescribe a predetermined ratio of P1:P2, P2:P3, or P3:P1 to allocate the 400 mW between the two transmitting mobiles. The third option is where each one of the three mobiles, i.e., m1, m2, or m3 may individually transmit. In this case, each mobile is limited by either the transmit power control algorithm setting individual power levels P1, P2, P3 or by the peak power $P_{max}$ so that each of P1, P2 and P3 is limited 200 mW.

The technology increases the amount of data that can be transmitted in the uplink to and then through a base station with multiple receive antennas to destination networks. This translates into faster data rates, greater capacity, better services, and increased operator revenues.

None of the above description should be read as implying that any particular element, step, range, or function is essential such that it must be included in the claims scope. The scope of patented subject matter is defined only by the claims. The extent of legal protection is defined by the words recited in the allowed claims and their equivalents. All structural and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. No claim is intended to invoke paragraph 6 of 35 USC §112 unless the words "means for" or "step for" are used. Furthermore, no embodiment, feature, component, or step in this specification is intended to be dedicated to the public regardless of whether the embodiment, feature, component, or step is recited in the claims.

The invention claimed is:

1. A method implemented in a base station communicating in a radio communications system, comprising:
   identifying, from among a plurality of mobile stations requesting service, a candidate transmitting set comprising a set of candidate mobile stations based on a ranking of signal-to-interference-plus noise ratios associated with respective candidate mobile stations;
   identifying all possible subsets of the candidate mobile stations in the candidate transmitting set;
   determining a total transmit power allowable for the possible subsets of candidate mobile stations;
   selecting, from among the plurality of possible subsets, a subset of the candidate mobile stations that maximizes a total number of bits processed by the base station from uplink transmissions transmitted by the selected subset in accordance with the total transmit power allowable;
   assigning transmission resources to each of the mobile stations in the selected subset of candidate mobile stations; and
   receiving the uplink transmissions from the selected subset of the candidate mobile stations.

2. The method in claim 1, wherein the assigning of transmission resources is performed to maximize a combined uplink transmission rate from that subset of candidate mobile stations processed by the base station.

3. The method in claim 1, further comprising:
   determining a fraction of a total uplink transmission capacity available in a cell area for a desired mobile station service;
   ranking multiple mobile stations in the candidate transmitting set requesting the desired service according to a priority scheme;
   selecting the subset of candidate mobile stations from those ranked in the candidate transmitting set that have the best priority; and
   determining a combination of the subset of candidate mobile stations that permits the base station to achieve a highest combined uplink transmission rate.

4. The method in claim 3, where the prioritization is performed based on a received signal quality measure.

5. The method in claim 3, wherein the candidate mobile stations are ranked in accordance with a priority measure that is proportionally fair in allocating uplink transmission rates for the subset of the mobile stations in the candidate transmitting set.

6. The method in claim 5, further comprising:
   using a fairness measure in the ranking based on a ratio of an uplink transmission rate requested and an average uplink transmission rate supported.

7. The method in claim 5, further comprising:
using a fairness measure in the ranking based on a Modified Largest Weighted Delay Fairness (MLWDF) measure.

8. The method in claim 3, wherein a number of candidate mobiles stations in the subset of candidate mobile stations is set to a value that maximizes data rate or revenue for one or more classes of service.

9. The method in claim 1, wherein uplink data transmissions from the subset of candidate mobile stations use orthogonal frequency division multiple access.

10. The method in claim 1, wherein the base station processes the signals from the mobile stations using a receiver that implements Successive Interference Cancellation (SIC).

11. A base station for communicating in a radio communications system, comprising:
electronic circuitry configured to:
identify, from among a plurality of mobile stations requesting service, a candidate transmitting set comprising a set of candidate mobile stations based on a ranking of signal-to-interference-plus noise ratios associated with respective candidate mobile stations;
identify all possible subsets of the candidate mobile stations in the candidate transmitting set;
determine a total transmit power allowable for the possible subsets of candidate mobile stations,
select, from among the plurality of possible subsets, a subset of the candidate mobile stations that maximizes a total number of bits processed by the base station from uplink transmissions transmitted by the selected subset in accordance with the total transmit power allowable; and
assign transmission resources to each of the mobile stations in the selected subset of candidate mobile stations; and
a radio receiver for receiving the uplink transmissions from the selected subset of the candidate mobile stations.

12. The base station in claim 11, wherein the electronic circuitry is configured to assign transmission resources to maximize a combined uplink transmission rate from that subset of candidate mobile stations processed by the base station.

13. The base station in claim 11, wherein the electronic circuitry is configured to:
determine a fraction of a total uplink transmission capacity available in a cell area for a desired mobile station service;
rank multiple mobile stations in the candidate transmitting set requesting the desired service according to a priority scheme;
select the subset of candidate mobile stations from those ranked in the candidate transmitting set that have the best priority; and
determine a combination of the subset of candidate mobile stations that permits the base station to achieve a highest combined uplink transmission rate.

14. The base station in claim 13, where the prioritization is based on a received signal quality measure.

15. The base station in claim 13, wherein the electronic circuitry is configured to rank the candidate mobile stations in accordance with a priority measure that is proportionally fair in allocating uplink transmission rates for the subset of the mobile stations in the candidate transmitting set.

16. The base station in claim 15, wherein the electronic circuitry is configured to use a fairness measure in the ranking based on a ratio of an uplink transmission rate requested and an average uplink transmission rate supported.

17. The base station in claim 15, wherein the electronic circuitry is configured to use a fairness measure in the ranking based on a Modified Largest Weighted Delay Fairness (MLWDF) measure.

18. The base station in claim 11, wherein the electronic circuitry is configured to send uplink channel resource assignments to the subset of candidate mobile stations.

19. The base station in claim 11, wherein the electronic circuitry is configured to process the signals from the transmitting mobile stations using a receiver that implements Successive Interference Cancellation (SIC).

20. A radio communications system comprising:
multiple mobile stations, and
a set of base stations for serving the multiple mobile stations distributed over a coverage area, each base station having multiple antennas for implementing a Selective-Per-Antenna-Rate-Control (S-PARC) scheme and including:
electronic circuitry configured to:
identify from among a plurality of mobile stations requesting service, a candidate transmitting set comprising the multiple mobile stations a set of candidate mobile stations as a candidate transmitting set based on a ranking of signal-to-interference-plus noise ratios associated with respective candidate mobile stations,
identify all possible subsets of the candidate mobile stations in the candidate transmitting set,
determine a total transmit power allowable for the possible subsets of candidate mobile stations,
select, from among the plurality of possible subsets, a subset of the candidate mobile stations that maximizes a total number of bits processed by the base station from uplink transmissions transmitted by the selected subset in accordance with the total transmit power allowable, and
assign transmission resources to each of the mobile stations in the selected subset of candidate mobile stations, and
a radio receiver for receiving the selected uplink transmissions from the subset of the candidate mobile stations.

21. The radio communications system in claim 20, wherein the electronic circuitry in each of the base stations is configured to assign transmission resources to maximize a combined uplink transmission rate from that subset of candidate mobile stations processed by the base station.

22. The radio communications system in claim 20, wherein the electronic circuitry in each of the base stations is configured to:
determine a fraction of a total uplink transmission capacity available in a cell area for a desired mobile station service;
rank multiple mobile stations in the candidate transmitting set requesting the desired service according to a priority scheme;
select the subset of candidate mobile stations from those ranked in the candidate transmitting set that have the best priority; and
determine a combination of the subset of candidate mobile stations that permits the base station to achieve a highest combined uplink transmission rate.

23. The radio communications system in claim 22, where the prioritization is based on a received signal quality measure.

24. The radio communications system in claim 22, wherein the electronic circuitry in each of the base stations is configured to rank the candidate mobile stations in accordance with a priority measure that is proportionally fair in allocating uplink transmission rates for the subset of the mobile stations in the candidate transmitting set.

25. The radio communications system in claim 20, wherein the electronic circuitry in each of the base stations is configured to process the signals from the transmitting mobile stations using a receiver that implements Successive Interference Cancellation (SIC).

* * * * *

UNITED STATES PATENT AND TRADEMARK OFFICE
CERTIFICATE OF CORRECTION

| | | |
|---|---|---|
| PATENT NO. | : 9,049,670 B2 | Page 1 of 2 |
| APPLICATION NO. | : 11/969002 | |
| DATED | : June 2, 2015 | |
| INVENTOR(S) | : Balachandran et al. | |

It is certified that error appears in the above-identified patent and that said Letters Patent is hereby corrected as shown below:

On the Title Page, in Item (56), under "OTHER PUBLICATIONS", in Column 2, Line 4, delete "Vehiculer" and insert -- Vehicular --, therefor.

On the Title Page, in Item (56), under "OTHER PUBLICATIONS", in Column 2, Line 7, delete "2,No.," and insert -- 2, No., --, therefor.

On Page 2, in Item (56), under "OTHER PUBLICATIONS", in Column 1, Line 7, delete "Mulitple" and insert -- Multiple --, therefor.

On Page 2, in Item (56), under "OTHER PUBLICATIONS", in Column 2, Line 2, delete "2004, 2004" and insert -- 2004, --, therefor.

On Page 2, in Item (56), under "OTHER PUBLICATIONS", in Column 1, Line 6, delete "Netowrking" and insert -- Networking --, therefor.

On Page 2, in Item (56), under "OTHER PUBLICATIONS", in Column 1, Line 9, delete "Netowrks," and insert -- Networks, --, therefor.

In the Drawings

In Fig. 2, Sheet 2 of 5, for Step "S7", in Line 2, delete "...m)n(M))." and insert -- ... m(n(M)). --, therefor.

In the Specification

In Column 4, Line 36, delete "station 14" and insert -- station 12 --, therefor.

In Column 5, Line 54, delete "(SINR):" and insert -- (SINR), --, therefor.

Signed and Sealed this
Third Day of May, 2016

Michelle K. Lee
*Director of the United States Patent and Trademark Office*

CERTIFICATE OF CORRECTION (continued)
U.S. Pat. No. 9,049,670 B2

In Column 6, Line 21, delete "$N_O$" and insert -- $N_0$ --, therefor.

In Column 6, Line 39, delete "$R(f_k,r)$" and insert -- $R(f_k,m)$ --, therefor.

In Column 6, Line 48, delete "sation" and insert -- station --, therefor.

In Column 7, Line 22, delete "duplexor." and insert -- duplexer. --, therefor.

In the Claims

In Column 12, Line 20, in Claim 20, delete "identify" and insert -- identify, --, therefor.